United States Patent [19]

Roberto

[11] 3,709,748
[45] Jan. 9, 1973

[54] IONIC INTERHALOGEN OXIDIZING AGENT AND METHOD
[75] Inventor: Francisco Q. Roberto, Lancaster, Calif.
[73] Assignee: The United States of America as represented by the Secretary of the Air Force
[22] Filed: May 26, 1970
[21] Appl. No.: 48,614

[52] U.S. Cl. ............... 149/109, 23/367, 204/157.1, 252/186
[51] Int. Cl. ............................................. C06b 15/00
[58] Field of Search ...... 149/109; 204/157.1; 23/367; 252/186

[56] References Cited

UNITED STATES PATENTS 3,423,175   1/1969   Horvitz et al. .................. 23/367 X Primary Examiner—Carl D. Quarforth
Assistant Examiner—Stephen J. Lechert, Jr.
Attorney—Harry A. Herbert, Jr. and Cedric H. Kuhn

[57] ABSTRACT $ClF_6PtF_6$ is prepared by reacting $PtF_6$ with $ClF_5$ in the presence of ultraviolet light. $ClF_4PtF_6$ is also produced by the reaction and may be removed from the mixture by decomposition. $ClF_6PtF_6$ is useful as an oxidizing agent and as an intermediate in the preparation of other oxidizing agents containing chlorine in its +7 valence state.

6 Claims, No Drawings

3,709,748

IONIC INTERHALOGEN OXIDIZING AGENT AND METHOD

BACKGROUND OF THE INVENTION

1. Field of the Invention

This invention relates to the preparation of ionic interhalogen compounds.

2. Description of the Prior Art.

The use of interhalogen compounds such as $ClF_3$ and $ClF_5$ and derivatives thereof such as $ClF_3{}^0$ as oxidizers for rocket propellants is well known by those working in the field. The success obtained with interhalogen compounds and their derivatives has led to increased interest in the development of methods and techniques whereby other potentially more active interhalogen compounds and interhalogen derivatives may be prepared. For example, interest in the field of interhalogen type compounds led to the preparation of $ClF_4PtF_6$ from the reaction of $ClF_5$ with $PtF_6$. The results of that preparation were reported by Roberto and Mamantov in Inorganica Chimica Acta, 2, 317(1968). The reaction was carried out in a nickel reactor and was found to proceed according to the equation: $ClF_5 + PtF_6 \rightarrow ClF_4PtF_6 + \frac{1}{2}F_2$. However, research leading to the Inorganica Chimica Acta article revealed that the compound, $ClF_4PtF_6$, decomposes slowly at room temperature under vacuum. Because of this tendency, the compound, although it is a strong oxidizing agent, is generally unsuitable as an oxidizer for solid rocket propellants.

SUMMARY OF THE INVENTION

It has now been found that a new compound, $ClF_6PtF_6$, may be prepared by reacting $ClF_5$ with $PtF_6$ in the presence of ultraviolet light. The reaction is preferably carried out in a sapphire reactor in order that it may be catalyzed by ultraviolet light and produces, along with $ClF_6PtF_6$, $ClF_4PtF_6$ as an impurity. The impurity, however, decomposes under vacuum at room temperature and effective removes itself from the product. Decomposition of the impurity may be accelerated by heating the product to a temperature of approximately 85°C for a short period of time.

DESCRIPTION OF THE PREFERRED EMBODIMENT

A typical reaction carried out in accordance with this invention is described below.

EXAMPLE — Reaction of $PtF_6$ and $ClF_5$

Platinum hexafluoride (1.26 mmoles, 0.390 gram) and chlorine pentafluoride (3.78 mmoles, 0.491 gram) were condensed. Condensation was accomplished by allowing the gaseous reactants to flow into an evacuated 7-cc sapphire reactor which was precooled to −196°C by a liquid nitrogen trap. A sapphire reactor was utilized in order to permit catalyzation of the reaction by ultraviolet light. After condensation, the reactor and its contents were slowly warmed to ambient temperature and left exposed to ultraviolet light at 22°–23C for a period of about 8 days. It was observed that (1) red $PtF_6$ gas disappeared and (2) the solid phase lightened from red-brown to bright yellow during the reaction. After about 8 days, the red $PtF_6$ gas had completely disappeared and the solid phase was bright yellow. At that time the reaction was considered complete and excess unreacted $ClF_5$ gas was removed under vacuum and the solid yellow reaction product was weighed. The reaction product weighed 0.489 gram.

Equipment utilized in the above reaction included, in addition to the 7-cc sapphire reactor, a vacuum system constructed from ¼ inch nickel pipe and nickel lines attached to the vacuum system for admission of reactants and passivating gas ($F_2$). The lines were attached to the vacuum system by silver welding and monel valves were utilized to open and close them. The sapphire reactor was attached to a monel valve which, in turn, was attached to the vacuum system by means of a Swagelok fitting. A liquid nitrogen trap was utilized to cool the reactor to −196°C. However, any refrigerant capable of lowering the temperature to −78°C (dry ice temperature) or below could have been used. Also, the 8 day reaction time described above may be varied for a period of from 5 to 14 days.

Prior to the above-described reaction, the entire system was passivated with fluorine at 300°C utilizing a heat gun.

After obtaining the bright yellow reaction product from the reaction described above, the product was analyzed according to the procedure described below.

Analysis of the Product Obtained from Reaction of $PtF_6$ and $ClF_5$

Analysis of products obtained from reactions similar to that described above showed that, under the conditions given, a mixture of about 50 weight percent $ClF_4PtF_6$ and about 50 weight percent $ClF_6PtF_6$ was obtained. When stored at room temperature, the $ClF_4PtF_6$ removes itself from the product by decomposition leaving $PtF_4$ as a harmless solid impurity. The removal of $ClF_4PtF_6$ may be hastened by heating the product.

To perform the analysis, the yellow solid was transferred, under nitrogen, to a 50 ml quartz reactor equipped so that it could be connected to the vacuum system. Prior to transfer of the product, the quartz reactor was purged with dry nitrogen and weighed in a dry box. After transfer, nitrogen in the reactor plus the bright yellow solid reaction product was weighed. Following weighing, the temperature of the reactor (and the product contained therein) was lowered to −196°C by placing the reactor in a liquid nitrogen trap. Then 5 to 10 ml (the amount varied in several runs) of double-distilled water was transferred to the reactor via the vacuum system and lines attached thereto in order to hydrolyze the reaction product. The reactor (and product therein) was then warmed to ambient temperature, by removing the liquid nitrogen trap, and allowed to remain at ambient temperature for about one-half hour. Then the solution was refrozen by lowering the temperature as before to −196°C, and 5 to 10 ml of hydrazine was added to the reactor in order to reduce platinum ions to platinum metal. (Like water, the amount of hydrazine added was different in different runs.) After addition of hydrazine, the reactor (and frozen mixture therein) was again warmed to ambient temperature. Solid platinum compounds formed by hydrolysis and platinum metal formed by reduction were filtered off and redissolved with aqua regia to yield chloroplatinic acid. The chloroplatinic acid was reduced to finely divided platinum with sodium formate. The finely divided platinum was then filtered, dried, and weighed. The chloride and fluoride concentrations of the solution which remained after the solid platinum compounds and metal formed by the hydrolysis and reduction described above had been filtered away were determined potentiometrically. A silver electrode was utilized to determine chloride concentration, and an Orion fluoride ion electrode was utilized to determine fluoride concentration. Analysis of the above-described typical reaction yielded the following.

Analysis for $ClF_6PtF_6$

|  | Pt | F | Cl |
|---|---|---|---|
| Calculated: | 42.6 | 49.7 | 7.7 |
| Found: | 42.7 | 47.2 | 5.2. |

X-ray diffraction patterns, infrared spectra, and Raman spectra were also obtained.

Infrared and Raman Spectra

The infrared spectrum of the reaction product obtained consisted of bands at 890, 875, and 540 cm$^{-1}$ which were assigned to $ClF_6+$ and a peak at 649 cm$^{-1}$ attributed to $PtF_6-$. Other bands indicated that $ClF_4+$ ions were also present in the reaction product. The 890, 875, and 540 cm$^{-1}$ bands were absent in the Raman spectrum. This absence indicates that the molecule is octahedral. Also, a comparison of the IR spectrum was made with that of the octahedral molecule $SF_6$. Since $ClF_6+$ is isoelectronic with $SF_6$, similarity in the spectra of the two compounds was expected and was found. The higher mass of the central atom in $ClF_6+$ was expected to cause a shift toward lower frequencies and this was observed for the infrared active bands. Bands for $SF_6$ are at 940, 890, and 615 cm$^{-1}$. Thus, the shift toward lower frequencies due to $ClF_6+$ was 50 cm$^{-1}$(940 to 890), 15 cm$^{-1}$(890 to 875), and 65 cm$^{-1}$(615 to 540), respectively.

X-Ray Diffraction

The X-ray diffraction pattern for $ClF_6PtF_6$ powder was relatively simple, indicating high symmetry. High symmetry is to be expected if both $ClF_6^+$ and $PtF_6^-$ are octahedral. The X-ray diffraction data appear in the following table. Lines due to the presence of $ClF_4^+$ are not included in the table.

TABLE

X-RAY DATA FOR $ClF_6^+PtF_6^-$

| d(obsd) | d(calcd) | hkl | Intensity |
|---|---|---|---|
| 5.717 | 5.74 | 110 | Strong |
| 4.036 | 4.06 | 200 | Very Strong |
| 3.328 | 3.32 | 211 | Medium |
| 2.576 | 2.569 | 310 | Light |
| 2.334 | 2.345 | 222 | Medium |
| 1.999 | 2.030 | 400 | Light |
| 1.923 | 1.915 | 411 | Very light |
| 1.774 | 1.772 | 421 | Very light |
| 1.727 | 1.732 | 332 | Very light |
| 1.530 | 1.535 | 520, 432 | Very Light |

Further Characterization of the Reaction Product

In order to further characterize the reaction product obtained from the above example, the yellow solid was reacted with excess $ClF_3O$ and the materials produced by the reaction analyzed. $ClF_3O$ was condensed by introducing it on top of the yellow solid at $-196°C$ and the mixture gradually warmed. At temperatures between $-75°C$ and $-35°C$, $ClF_4PtF_6$ present in the yellow solid reacted with $ClF_3O$ according to the equation:

$$ClF_4PtF_6 + ClF_3O \rightarrow ClF_3 + ClF_2OPtF_6.$$

Above $-35°C$, the melting point of $ClF_3O$, $ClF_6PtF_6$ reacted with the $ClF_3O$ according to the equation:

$$ClF_6PtF_6 + ClF_3O \rightarrow ClF_2OPtF_6 + ClF_7.$$

Upon formation, the $ClF_7$ underwent further reaction according to the equation:

$$ClF_7 \rightarrow ClF_5 + F_2.$$

Thus, based on the weight of $F_2$, $ClF_5$, and $ClF_2OPtF_6$ produced, the yellow reaction product from the example was calculated to contain approximately a 50:50 weight percentage mixture of $ClF_4PtF_6$ and $ClF_6PtF_6$. The absence of $F_2$ among the reaction products at temperatures below $-35°C$ indicated that $ClF_4PtF_6$ was a reactant along with $ClF_3O$ at those temperatures. On the other hand, the appearance of $F_2$ among the reaction products at temperatures above $-35°$ C indicated that $ClF_6PtF_6$ was a reactant along with $ClF_3O$ at those temperatures.

Removal of $ClF_4PtF_6$ from the Reaction Product $ClF_4PtF_6$ is known to slowly decompose under vacuum at room temperature. The decomposition proceeds according to the equation:

$$ClF_4PtF_6(solid) \rightarrow ClF_5(gas) + PtF_5(solid).$$

The solid $PtF_5$ undergoes further decomposition according to the equation:

$$2PtF_5(solid) \rightarrow PtF_4(solid) + PtF_6(gas).$$

Thus, if it is desired, $ClF_4PtF_6$ may be removed from the reaction product merely by allowing the reaction product to stand in a dry box under vacuum until the $ClF_4PtF_6$ decomposes. The decomposition leaves a minor amount of solid $PtF_4$ (about 19 weight percent) as an impurity with the desired $ClF_6PtF_6$. However, this impurity causes no adverse effects when $ClF_6PtF_6$ is reacted to product other oxidizing agents as described below. If it is desired, the decomposition of $ClF_4PtF_6$ may be accelerated by warming the mixture. Warming to about 85°C greatly speeds the decomposition process and even higher temperatures (up to 350°C) may be used with no adverse effects on the $ClF_6PtF_6$. Decomposition is considered complete when red $PtF_6$(gas) is no longer produced.

Uses of $ClF_6PtF_6$ $ClF_6PtF_6$, containing $PtF_4$ as an impurity, may be utilized to produce other oxidizing agents by reacting it with certain suitable materials. Examples of some reactions are:

(1) $ClF_6PtF_6 + ClF_3O \rightarrow ClF_7 + ClF_2OPtF_6$ (2) $ClF_6PtF_6 + MXF_4 \rightarrow MPtF_6 + ClF_6XF_4$ and (3) $ClF_6PtF_6 + MXF_6 \rightarrow MPtF_6 + ClF_6XF_6$ wherein M is an alkali metal such as Na or K and X is an element such as B, Sb, or As.

To carry out the reactions, $ClF_6PtF_6$ and the second reactant are condensed together at $-196°C$ and then allowed to warm. When the melting point of the second reactant is reached the reaction begins and continues until the reactants are exhausted.

In reaction (1) above, the reaction products, $ClF_7$ and $ClF_2OPtF_6$, can be separated by taking advantage of the fact that $ClF_7$ is a liquid at room temperature and $ClF_2OPtF_6$ is a solid. In reactions (2) and (3) all reaction products are solids at room temperature and separation is accomplished by taking advantage of the fact that certain interhalogen solvents such as $IF_5$ and $BrF_5$ will dissolve the $ClF_6XF_4$ and $ClF_6XF_6$ compounds but not the $MPtF_6$ compounds.

I claim:

1. A composition of matter having the formula $ClF_6PtF_6$.

2. The composition of claim 1 which contains a minor amount of $PtF_4$ as an impurity.

3. A composition which consists essentially of approximately equal parts by weight of $ClF_6PtF_6$ and $ClF_4PtF_6$.

4. A method of preparing a mixture of $ClF_4PtF_6$ and $ClF_6PtF_6$ which comprises:
   a. condensing $ClF_5$ and $PtF_6$ by introducing same into a reaction zone maintained at a temperature in the range of about $-78°C$ to $-196°C$;
   b. warming said reaction zone to approximately room temperature; and
   c. exposing said reaction zone and its contents to ultraviolet light.

5. The method according to claim 4 wherein said reaction zone is a sapphire reactor.

6. The method of preparing an oxidizing agent which contains Cl in its $+7$ valence state which comprises:
   a. condensing into a reactor a first reactant consisting essentially of $ClF_6PtF_6$ containing $PtF_4$ as an impurity and a second reactant selected from the group consisting of $ClF_3O$, $MXF_4$, and $MXF_6$ wherein M is selected from the group consisting of Na and K and wherein X is selected from the group consisting of B, Sb, and As; and
   b. warming the reactants to the melting point of the second reactant.

* * * * *